United States Patent

[11] 3,626,160

[72] Inventor Jacob John Hagopian
San Jose, Calif.

[21] Appl. No. 888,629
[22] Filed Dec. 29, 1969
[45] Patented Dec. 7, 1971
[73] Assignee International Business Machines Corporation
Armonk, N.Y.

[54] MAGNETIC RECORD SENSING DEVICE
5 Claims, 2 Drawing Figs.

[52] U.S. Cl. .......................... 235/61.11 D, 340/174.1 H
[51] Int. Cl. .......................... G06k 7/08, G11b 5/00
[50] Field of Search .......................... 340/174.1 A, 174.1 B, 174.1 C, 174.1 H; 179/100.2 MI, 100.2 S, 100.2 A, 100.2 CB; 235/61.114, 61.9

[56] References Cited

UNITED STATES PATENTS

| | | | |
|---|---|---|---|
| 2,878,321 | 3/1959 | Davis | 179/100.2 S |
| 2,927,303 | 3/1960 | Elbinger | 235/61.11 (4) X |
| 2,952,008 | 9/1960 | Mitchell et al. | 235/61.11 (4) X |
| 3,114,010 | 12/1963 | Wolf et al. | 179/100.2 S |
| 3,479,664 | 11/1969 | Stuart-Williams et al. ... | 340/174.1 |
| 2,961,649 | 11/1960 | Eldredge et al. | 235/61.11 D |
| 3,031,341 | 4/1962 | Eschenfelder | 179/100.2 A |
| 3,066,197 | 11/1962 | Uemura | 179/100.2 CB |
| 3,353,164 | 11/1967 | Folsom | 340/174.1 H |

*Primary Examiner*—Maynard R. Wilbur
*Assistant Examiner*—Thomas J. Sloyan
*Attorneys*—Hanifin and Jancin and Shelley M. Beckstrand

ABSTRACT: A single channel processing system for reading magnetic credit cards having two parallel tracks of discrete complementary data bits. Two prebiasing magnets bias the data bits and complementary bits in opposite directions, and a single read back head scans both tracks simultaneously.

*INVENTOR*
JACOB J. HAGOPIAN

BY [signature]
ATTORNEY

MAGNETIC RECORD SENSING DEVICE

REFERENCES

None

BACKGROUND OF THE INVENTION

1. Field of the Invention

The present invention is directed to a method and apparatus for reproducing magnetic data and more specifically, the reproducing through a single transducer magnetic data contained in complementary parallel tracks of discrete magnetic bits.

2. Prior Art

Identification cards such as credit cards, designed to carry permanent identification or amount information along two parallel tracks in the form of discretely imprinted magnetic patterns covered with a thin opaque overlay possess many outstanding qualities connected with security and performance of the data itself, and reliability of the simple magnetic reading system required. The latter is made possible by inscribing binary data bits on one track and their complementary bits on the other track so that self-clocking is made possible during the reading operation.

Offsetting the reliability advantage of the two-track scheme is the added cost of a second magnetic head and amplifier channel normally required. This is an important factor affecting the total cost of a credit card reading terminal.

Single magnetic head and amplifier channel credit card terminals known to the prior art require that all of the identification and amount data or information be coded in a single track. This presents severe problems of clocking caused by jitter and variation in scanning speed.

The foregoing and other objects, features and advantages of the invention will be apparent from the following more particular description of a preferred embodiment of the invention, as illustrated in the accompanying drawings.

DETAILED DESCRIPTION OF THE INVENTION

Figure 1:
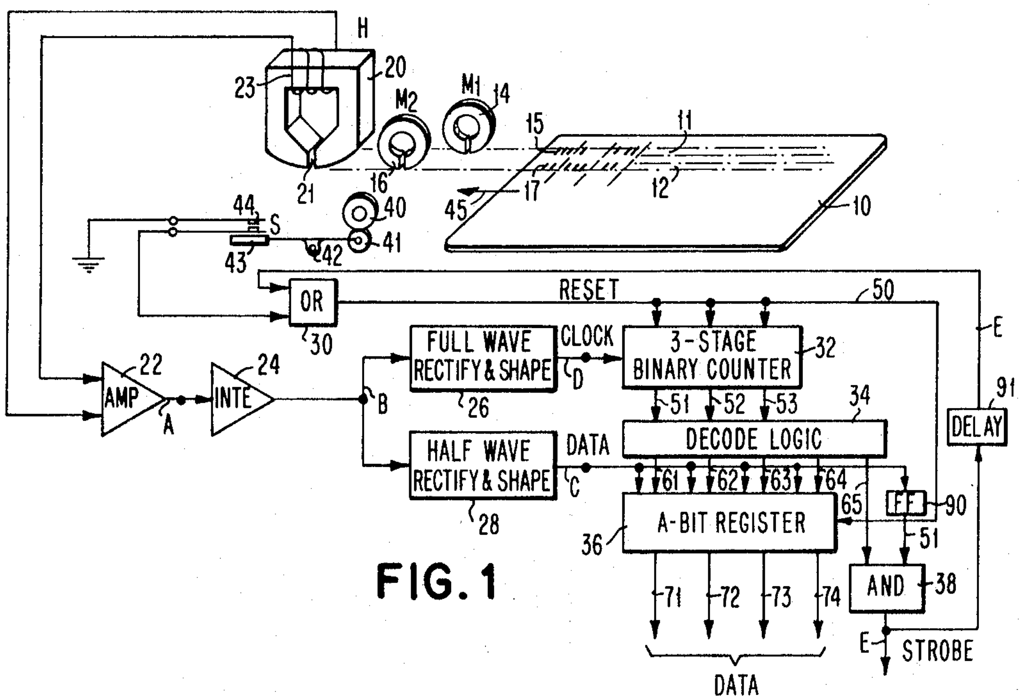
FIG. 1 is a schematic view showing the single channel processor for reading a credit card and the associated integrating and decoding logic.

Referring now to FIG. 1, the single channel processor for parallel data and complementary data tracks on a substrate will be described.

The credit card 10 is designed to carry permanent identification and/or amount information along two parallel tracks 11 and 12 in the form of discretely imprinted magnetic patterns or bars of magnetic material 15 and 17 covered with a thin opaque overlay (not shown). Each discrete far 15, 17 may be positioned on card 10 by techniques familiar to those skilled in the art, such as deposition or hot stamping. For the purposes of the following discussion, a credit card having complementary data tracks divided into five-bit characters, four data bits and a stop bit, will be assumed. The data bits are preferably of high coercivity material, and the spacing is shown exaggerated for a reason of clarity. Typically, good spacing might be 0.020 inches and the width of each track approximately 0.100 inches.

The magnetic elements consist of permanent or electromagnets 14 and 16, and a magnetic head 20 having a gap 21 and coil 23. The magnetic elements are mounted in a suitable assembly (not shown) and the said assembly and the credit card are adapted for relative motion. For the purpose of the following discussion, assume that the credit card 10 is moved beneath the magnetic elements 14, 16 and 20 in the direction of arrow 45. As will be apparent to those skilled in the art, motion of either the card 10 or the magnetic elements 14, 16 and 20 will accomplish scanning of the imprinted data 15, 17.

Magnets 14 and 16 are arranged so as to establish unidirectional magnetic fields of oppositely polarity.

The output of head 20 is fed to amplifier 22, where the signal is amplified and fed to integrator 24. The output of integrator 24 is fed to full wave rectify and shape circuit 26 and to half wave rectify and shape circuit 28. The output of full wave rectifier 26 represents clock data and is fed to the three stage binary counter 32. The output of the half wave rectifier 28 represents data and is fed to the four-bit register 36. The output of the three stage binary counter 32 is fed along lines 51–53 to decode logic 34. The output of decode logic 34 is fed along lines 61–64 along with the data output from half wave rectifier circuit 28 into the four-bit register 36. The inputs to AND-circuit 38 are the stop bit along line 65 from decode logic 34 and the output of half wave rectifier 28. The output of said AND-circuit 38 represents the strobe signal and after passing through delay circuit 91 is fed into the OR-circuit 30 along with the output of switch 44. The output of OR-circuit 30 represents the reset signal and is fed into the three stage binary counter 32 and into the four bit register 36 along line 50.

The clock (D( and data (C) signals obtained from the rectify and shape circuits 26 and 28, which are driven by signal B from integrator 24, are fed to binary counter 32 and register 36 respectively. Outputs on lines 51, 52, and 53 are developed as binary counting of clock pulses D proceeds. These outputs are processed in decode logic 34 in such a way that outputs 61–65 switch to the "1" state and back to "zero" state in a sequence which matches the timing of clocking output D.

Each stage of the four-bit register 36 receives the commutated clock pulses on one of the corresponding lines 61–64, along with the data pulses C supplied in common to all stages of register 36. Coincidence of a data pulse C and the clock signal which sequentially activates lines 61–64 results in the storing of a "1" bit in a corresponding stage of the four-bit register 36.

When the fifth bit in each character group on the credit card is read, decode logic 34 delivers a stop signal to AND-circuit 38. If at the same time flip-flop 90 is in the "one" state, AND-circuit 38 delivers strobe signal E which activates the data utilization part of the system and, after a suitable delay introduced by delay circuit 91, causes resetting of binary counter 32 and register 36 in preparation for reading and decoding the next character magnetically encoded on the credit card.

Figure 2:
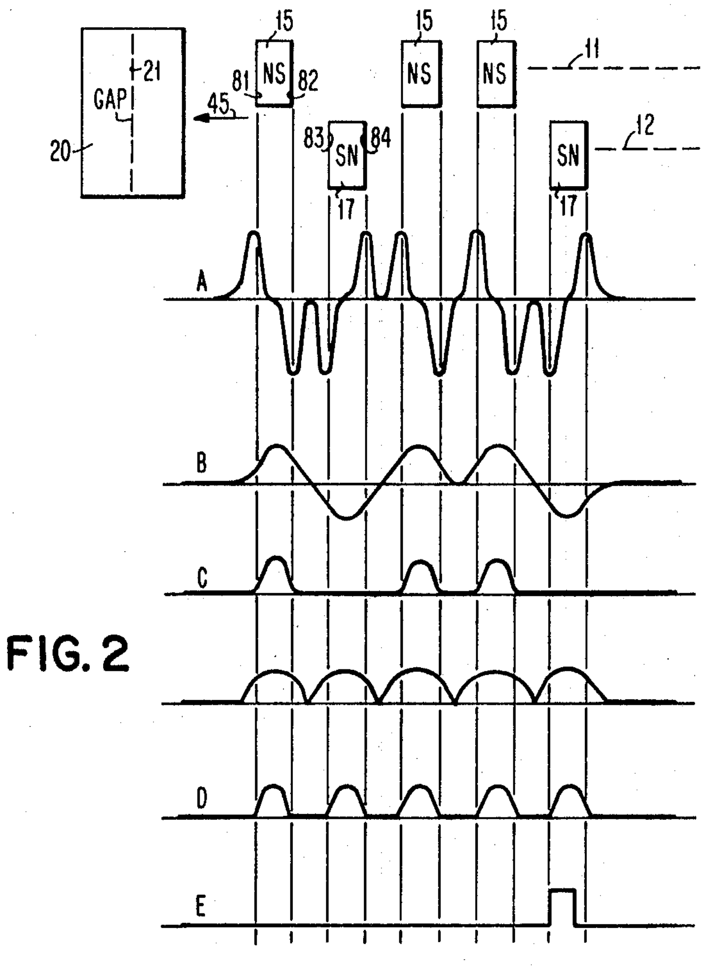
FIG. 2 shows a series of wave forms taken at various points in the above decoding logic.

Referring now to FIG. 2, a general description will be given of the various wave forms and signals shown. Assume that the credit card carrying magnetic bits 15 and 17 along tracks 11 and 12 is fed in the direction of arrow 45 beneath gap 21 of head 20. Assume further, that the data on the credit card is in the form of a character having the following bits: 10110, where "1" is data and "0" is the complement.

As gap 21 passes over, relatively speaking, the magnetic inscription on the card, the signal is fed to amplifier 22 and integrator 24, the output which is shown as signal B, and thence into the full wave rectifier 26 and half wave rectifier 28.

As will be obvious to those skilled in the art, the dipulse output (signal A) of head 20 may be integrated by integrator 24 to obtain a unipolar signal output as shown as signal B or signal A can be processed through a suitable phase detector (not shown) to create a signal similar to signal B. As used herein, referring to FIG. 2 waveform A, a dipulse representing a data bit is a positive going pulse followed by a negative going pulse, and a complementary bit is represented by a negative going pulse followed by a positive going pulse. After integration or phase detection, the result is unipulse signal B, where a positive going pulse represents a data bit and a negative going pulse represents a complementary bit. The output of the full wave rectifier 26 is shown as signal C. Signal E represents the character strobe derived from an always present "one" or "-zero" fifth bit in the binary numeric code of the magnetic inscription of the card, and appears at the output of AND 38 when the output of flip-flop 90 (shown as line 51) is switched to a "one" state (indicating an odd count), and a "stop" signal is delivered by decode logic 34 along line 65.

In operation, assuming that the card 10 is moved, the two magnetic tracks 11 and 12 pass beneath permanent or electro magnetics 14 and 16 which give tracks 11, 12 opposite directions of magnetic bias. Prior to reaching the sensing pole of magnetic head 20, the card 10 first actuates switch 44 to reset counter 32 and register 36. The read back signal output from magnetic head 20 then is as follows: As gap 21 approaches edge 81 of the first "one" bit 15, a positive current is induced in coil 23 which is shown as the first positive peak on signal A. As said gap 21 leaves the first "one" bit 15 by passing across edge 82, a negative current is induced in coil 23 which is then shown as the first negative pulse of circuit A. The gap 21 continues scanning and approaches edge 83 of the first "-zero" bit 17 and a negative current is induced in coil 23 and is amplified to the form shown as the second negative pulse in signal A. As the gap 21 continues scanning the card, it passes edge 84 of the first "zero" bit 17, which causes a positive current output from amplifier 22 shown as the second positive peak in signal A. The scanning of edges 82 and 83 both provide a negative current in coil 23 inasmuch as the bits 15 and 17 are oppositely biased. The gap 21 continues to scan the various "1" and "o" bits 15 and 17 to create the remainder of the signals shown as signal A at the amplifier 22 output.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An apparatus for sensing and decoding an indentification card having two parallel tracks of discrete bars of magnetic material on a nonmagnetic substrate separating adjacent bars, the first track containing a plurality of bars representing data bits and the second track containing a plurality of bars representing complementary bits, comprising:

first magnet means applying a first unidirectional magnetic field for biasing said data bits in a first direction, second magnet means applying a second unidirectional magnetic field for biasing said complementary bits in the opposite direction, sensing head means having a single read gap which simultaneously scans both said tracks for providing a dipulse signal representing the data and complementary bits, means for providing relative motion between said identification card and said first and second magnet means and sensing head means, said first and second magnet means prebiasing said bits for sensing by said sensing head means, converting means responsive to the output of said sensing head means for converting said dipulse signal into a unipolar signal representing said data and complementary bits, decoding means responsive to the output of said converting means for decoding the magnetic information on said card.

2. A method for reading magnetic data from an identification card wherein said data is represented by two parallel data and complementary-data tracks of discrete bars of magnet material, the first track containing a plurality of bars representing data bits, and the second track containing a plurality of bars representing complementary bits, comprising the steps of:

prebiasing said bars of magnetic material in said data track in a first direction, prebiasing said bars of magnetic material in said complementary-data track in the opposite direction, simultaneously scanning both tracks with a read head having a single read gap to provide a dipulse signal representing the data and complementary bits, converting the dipulse signal output of said read head into a unipolar signal representing said data and complementary bits, and decoding said unipolar signal to form multiple bit characters.

3. The apparatus of claim 1 wherein said converting means comprises an integrator circuit.

4. The apparatus of claim 1 wherein said decoding means comprises:

half wave rectifying means responsive to said unipolar signal for providing a data output signal representing said data bits, and full wave rectifying means responsive to said unipolar signal for providing a clock output signal representing the composite data and complementary bits.

5. The apparatus of claim 3 further comprising:

register means responsive to said data output signal and said clock output signal for assembling the serial data pulses into a multiple bit character.

* * * * *